United States Patent
Linsey et al.

(10) Patent No.: US 11,972,441 B2
(45) Date of Patent: Apr. 30, 2024

(54) INTELLIGENT PRODUCT PEDIGREE FRAMEWORK FOR PRODUCT AUTHENTICITY AND VERIFICATION

(71) Applicant: Dell Products L.P., Round Rock, TX (US)

(72) Inventors: David John Linsey, Marietta, GA (US); Bijan Kumar Mohanty, Austin, TX (US); Lokajit Tikayatray, Bangalore (IN); Hung Dinh, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 191 days.

(21) Appl. No.: 17/654,298

(22) Filed: Mar. 10, 2022

(65) Prior Publication Data

US 2023/0289822 A1    Sep. 14, 2023

(51) Int. Cl.
*G06Q 10/08* (2024.01)
*G06Q 30/018* (2023.01)
*H04L 9/32* (2006.01)
*H04L 9/00* (2022.01)

(52) U.S. Cl.
CPC ......... *G06Q 30/0185* (2013.01); *G06Q 10/08* (2013.01); *H04L 9/3239* (2013.01); *H04L 9/50* (2022.05)

(58) Field of Classification Search
None
See application file for complete search history.

(56) References Cited

U.S. PATENT DOCUMENTS

| | | | |
|---|---|---|---|
| 2006/0277061 A1* | 12/2006 | Revanur | G06Q 10/06 705/333 |
| 2009/0125445 A1* | 5/2009 | Mousavi | G06F 21/105 705/59 |
| 2009/0194587 A1* | 8/2009 | DeVet | G16H 20/13 235/385 |
| 2011/0099193 A1* | 4/2011 | Jensen | G06F 16/215 707/769 |
| 2017/0116189 A1* | 4/2017 | Chigusa | G06F 16/93 |
| 2020/0117690 A1* | 4/2020 | Tran | G06F 16/90332 |
| 2020/0151741 A1* | 5/2020 | Paulsen | G06Q 30/0201 |
| 2021/0182874 A1* | 6/2021 | Gurnov | G06Q 10/10 |
| 2021/0349897 A1* | 11/2021 | Pierri | G06F 11/079 |
| 2022/0171891 A1* | 6/2022 | Sinha | G05B 23/0243 |
| 2022/0187847 A1* | 6/2022 | Cella | G06Q 50/40 |

* cited by examiner

*Primary Examiner* — Matthew T Sittner
(74) *Attorney, Agent, or Firm* — DALY, CROWLEY, MOFFORD & DURKEE, LLP

(57) ABSTRACT

In one aspect, an example methodology implementing the disclosed techniques includes, by a computing device, retrieving touchpoint data of a product and creating a data element based on the retrieved touchpoint data, the data element includes information about a touchpoint of the product by a stakeholder. The method also includes, by the computing device, adding the created data element to a product pedigree list, wherein the product pedigree list is a pedigree list which contains data elements of the product. The method may further include, by the computing device, storing the product pedigree list in a graph database. The method may further include, by the computing device, predicting, using a machine learning (ML) model (e.g., an autoencoder), whether a state of the product pedigree list is normal or anomalous.

13 Claims, 6 Drawing Sheets

INTELLIGENT PRODUCT PEDIGREE FRAMEWORK FOR PRODUCT AUTHENTICITY AND VERIFICATION

BACKGROUND

Product pedigree verification is important for various reasons in industries such as pharmaceutical and high-tech. For example, many drug manufacturers are providing drug pedigree information (i.e., documented history of a drug product's chain of custody from excipient to manufacturing to shipping) in efforts to safeguard against threats posed by counterfeit drug products entering the drug supply chain undetected. In fact, some states have enacted regulations which make it mandatory for drug manufacturers to include product pedigree information in transactions involving drug products. Similarly, high-tech manufacturers, such as manufacturers of computing and other electronic devices, may provide product pedigree information to safeguard their products. For example, today's computing devices are always-on and always-connected to a network or networks with increasing frequency. If these computing devices are compromised with unauthorized software and other breaches such as viruses and ransomware, for example, the compromised computing devices can propagate the compromises far and wide in a very short amount of time. These breaches can in part be attributed to compromised supply chains between the manufacturer and the ultimate end customer.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one illustrative embodiment provided to illustrate the broader concepts, systems, and techniques described herein, a method includes, by a computing device, retrieving touchpoint data of a product and creating a data element based on the retrieved touchpoint data, the data element includes information about a touchpoint of the product by a stakeholder. The method also includes, by the computing device, adding the created data element to a product pedigree list, wherein the product pedigree list is a pedigree list which contains data elements of the product.

In some embodiments, adding the created data element to the product pedigree list includes linking the created data element to a last data element in the product pedigree list. In some embodiments, linking the created data element to the last data element includes including in the created data element a hash of the last data element.

In some embodiments, the method further includes, by the computing device, storing the product pedigree list in a graph database. In one aspect, the product pedigree list is stored in the graph database in a labeled property graph (LPG) format.

In some embodiments, the method further includes, by the computing device using a machine learning (ML) model, predicting whether a state of the product pedigree list is normal or anomalous. In some embodiments, the ML model includes an autoencoder. In some embodiments, the method further includes, by the computing device, in response to a prediction that the state of the product pedigree list is anomalous, generating an alert informing of the prediction of the anomalous state.

According to another illustrative embodiment provided to illustrate the broader concepts described herein, a system includes one or more processors and one or more non-transitory machine-readable mediums configured to store instructions that when executed on the one or more processors, causes the one or more processors to execute a process corresponding to the aforementioned method or any described embodiment thereof.

According to another illustrative embodiment provided to illustrate the broader concepts described herein, a non-transitory machine-readable medium encodes instructions that when executed by one or more processors cause a process to be carried out, the process corresponding to the aforementioned method or any described embodiment thereof.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1A:
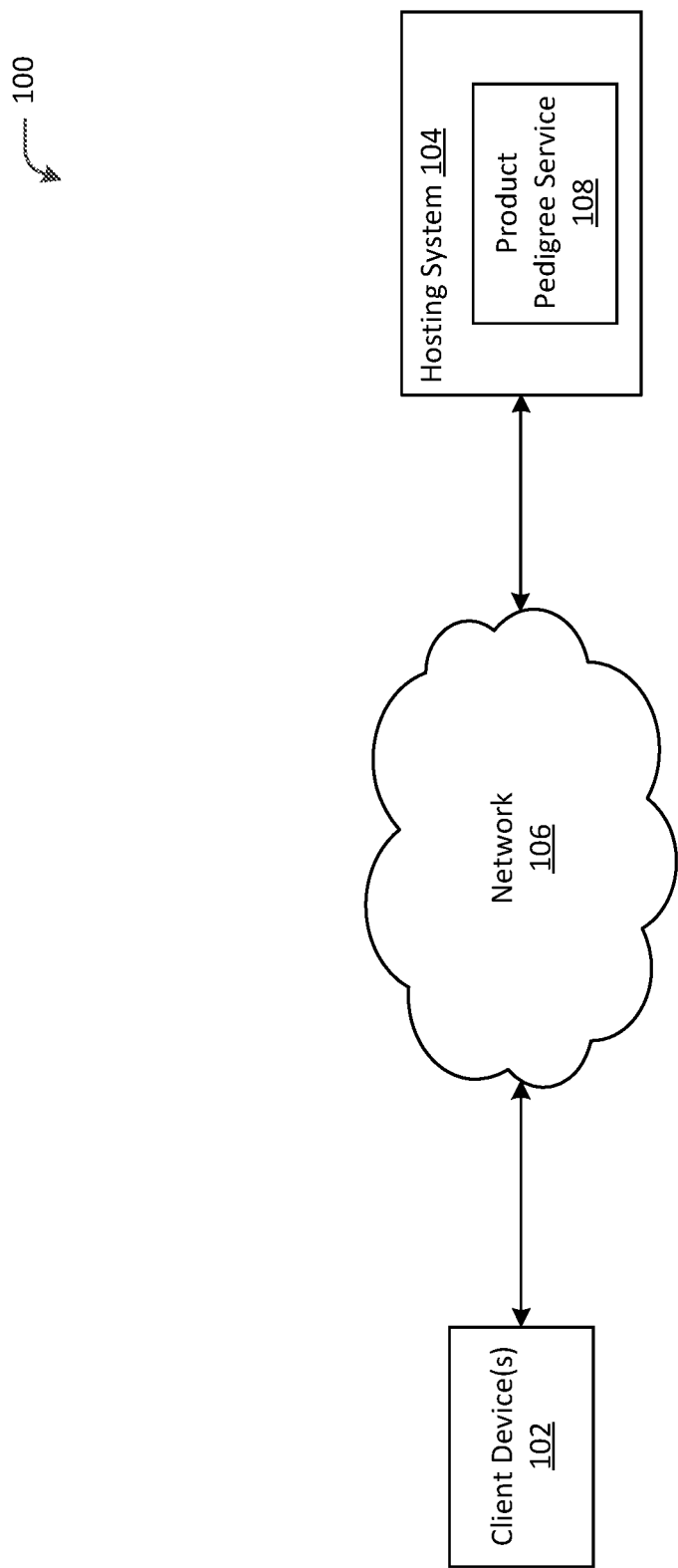
FIG. 1A is a block diagram of an illustrative network environment for an intelligent product pedigree verification framework, in accordance with an embodiment of the present disclosure.

As noted above, product pedigree verification is important for combatting against counterfeit or compromised products entering the supply chain. To illustrate, a supply chain for high-tech manufacturing may include various stages such as parts supply, assembly, deployment, custom configuration by channel partners, and logistics before the products reach a customer. In addition, the supply chain may be further complicated by product customization and just-in-time configuration according to customer demand. Whether such customization/configuration be with a value-added reseller (VAR), system integrator, or original equipment manufacturer (OEM), products such as computer hardware may continually evolve during their lifecycle and may transition through many different owners (or "stakeholders"). As a product moves through the supply chain, the various stakeholders in the supply chain (e.g., product sales, supplier, assembler, deployer, channel partner, VAR, system integrator, logistics provider, etc.) provide enormous amounts of data and information about the stakeholder's contact and/or interaction with the product. Such contact and/or interaction with a product is referred to herein as a "touchpoint" and the corresponding data and information is referred to as the "touchpoint data." Currently, touchpoint data provided by the various stakeholders are usually stored and managed in a fragmented or siloed manner using a few centralized systems and applications such as order management (OM), order fulfillment, supply chain management (SCM), and customer relationship management/information technology service management (CRM/ITSM) systems. However, reliance on this fragmented or siloed management of the touchpoint data where the various centralized systems store disparate elements or portions of the touchpoint data is susceptible to fraudulent data. The fragmented or siloed management of the touchpoint data also results in missing or reduced visibility from a product pedigree perspective and is unable to ensure the overall supply chain authenticity and integrity.

Certain embodiments of the concepts, techniques, and structures disclosed herein are directed to a framework for authenticity verification of product pedigree information. In some embodiments, authenticity verification is achieved by generating a data element (or "record") of each touchpoint by a stakeholder in a product's lifecycle. A particular data element of a touchpoint by a stakeholder comprises information about that touchpoint such as an identity of the stakeholder, a timestamp indicating a time of the interaction with the product, role of the stakeholder, type of interaction (e.g., booking, parts supply, assembly, etc.) with the product, and any other information and/or details about the interaction such as documents exchanged, etc. The individual data elements associated with a product may be linked to generate a federated list of product pedigree information (sometimes referred to herein as a "pedigree list") of that product. In other words, a pedigree list of a particular product (sometimes referred to herein as a "product pedigree list") links all the data elements of the same product. In one such embodiment, the individual data elements in a product pedigree list may be linked using a cryptographic hash (or "hash") of a preceding data element (e.g., immediately preceding data element) in the product pedigree list. Utilizing a hash of each data element enables the framework to provide authenticity and integrity of the supply chain of the product in its lifecycle. Also, leveraging a hash of each data element to link the individual data elements in a product pedigree list enables the framework to provide anti-tampering guarantees which may be important to the various stakeholders. For instance, using the hashes to link the data elements in a product pedigree list ensures that the individual data elements are immutable (i.e., the individual data elements in the product pedigree list is not susceptible to change without detection).

In some embodiments, the product pedigree lists may be stored or otherwise maintained using a graph database. Storing the product pedigree lists in the graph database enables the framework to provide application programming interface (API) based access to the product data across an enterprise (e.g., across an organization that is manufacturing or providing the product).

In some embodiments, the framework provides a deep learning algorithm that is trained using machine learning techniques to detect anomalies related to stakeholder behavior in a lifecycle of a product. For example, in one embodiment, a deep learning algorithm, such as an autoencoder (also known as a multilayer perceptron (MLP) or an artificial neural network (ANN)), may be trained using a modeling dataset generated from an organization's historical product pedigree information (e.g., the large amount of touchpoint data provided by the various stakeholders in the lifecycles of the organization's historical products). The modeling dataset can be used to train the deep learning algorithm, where the training can configure the machine learning (ML) model to learn the behaviors of the various stakeholders and their relationships with the organization and with one another in the lifecycles of the historical products. Once the deep learning algorithm is trained, the ML model can, in response to an input of a product pedigree list, predict whether a state of the input product pedigree list is normal or anomalous. In other words, product pedigree information of a product (e.g., a new product) can be fed into the ML model, and the ML model can detect any anomalies related to stakeholder behaviors in the lifecycle of the product based on the learned behaviors (or "trends") in the modeling dataset.

Turning now to the figures, FIG. 1A is a block diagram of an illustrative network environment 100 for an intelligent product pedigree verification framework, in accordance with an embodiment of the present disclosure. As illustrated, network environment 100 may include one or more client devices 102 communicatively coupled to a hosting system 104 via a network 106. Client devices 102 can include smartphones, tablet computers, laptop computers, desktop computers, workstations, or other computing devices configured to run user applications (or "apps"). In some implementations, client device 102 may be substantially similar to a computing device 500, which is further described below with respect to FIG. 5.

Hosting system 104 can include one or more computing devices that are configured to host and/or manage applications and/or services. Hosting system 104 may include load balancers, frontend servers, backend servers, authentication servers, and/or any other suitable type of computing device. For instance, hosting system 104 may include one or more computing devices that are substantially similar to computing device 500, which is further described below with respect to FIG. 5.

As shown in FIG. 1A, hosting system 104 may include a product pedigree service 108. In some embodiments, hosting system 104 can be provided within a cloud computing environment, which may also be referred to as a cloud environment, cloud computing or cloud network. The cloud computing environment can provide the delivery of shared computing services (e.g., microservices) and/or resources to multiple users or tenants. For example, the shared resources and services can include, but are not limited to, networks, network bandwidth, servers, processing, memory, storage, applications, virtual machines, databases, software, hardware, analytics, and intelligence. As described in further detail at least with respect to FIGS. 1B-5, product pedigree service 108 is generally configured to provide a framework for product pedigree verification.

Network 106 may correspond to one or more wireless or wired computer networks including, but not limited to, local-area networks (LANs), metropolitan area networks (MANs), wide area networks (WANs), wireless local-area networks (WLAN), primary public networks, primary private networks, cellular networks, Wi-Fi (i.e., 802.11) networks, Bluetooth networks, the Internet, and/or any other suitable type of communications network. In some embodiments, network 106 may include another network or a portion or portions of other networks.

Figure 1B:
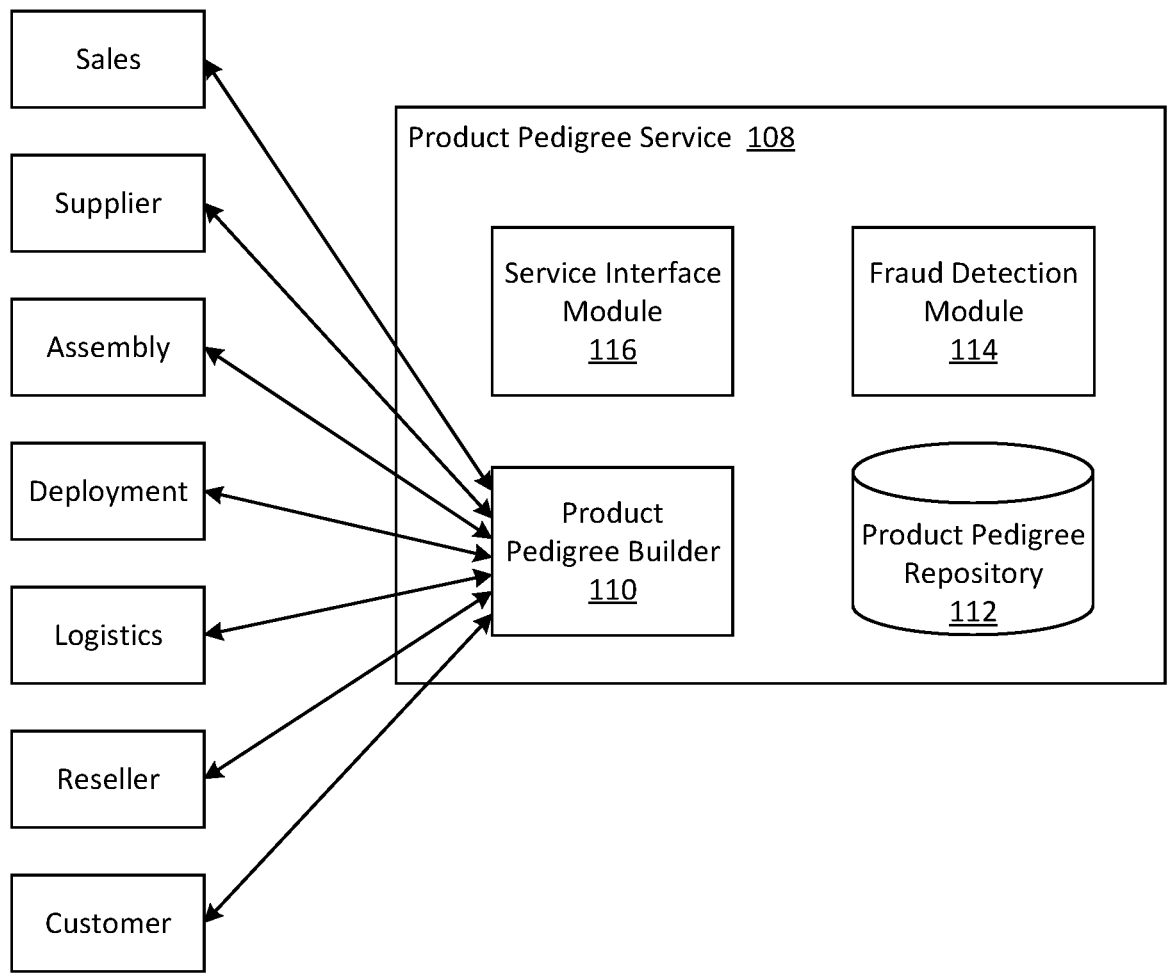
FIG. 1B is a block diagram of an illustrative product pedigree service, in accordance with an embodiment of the present disclosure.

FIG. 1B is a block diagram of product pedigree service 108, in accordance with an embodiment of the present disclosure. An organization such as a company, an enterprise, or other entity that manufactures/produces/sells products (e.g., electronic devices), for instance, may implement and use the framework of product pedigree service 108 to validate the product pedigree of its products. In some embodiment, the organization can use the framework to detect anomalies related to stakeholder behaviors in the lifecycle of its products.

Product pedigree service 108 can be implemented as computer instructions executable to perform the corresponding functions disclosed herein. Product pedigree service 108 can be logically and/or physically organized into one or more components. The various components of product pedigree service 108 can communicate or otherwise interact utilizing application program interfaces (APIs), such as, for example, a Representational State Transfer (RESTful) API, a Hypertext Transfer Protocol (HTTP) API, or another suitable API, including combinations thereof.

In the example of FIG. 1B, product pedigree service 108 includes a product pedigree builder 110, a product pedigree repository 112, a fraud detection module 114, and a service interface module 116. Product pedigree service 108 can include various other components (e.g., software and/or hardware components) which, for the sake of clarity, are not shown in FIG. 1B. It is also appreciated that product pedigree service 108 may not include certain of the components depicted in FIG. 1B. For example, in certain embodiments, product pedigree service 108 may not include one or more of the components illustrated in FIG. 1B, but product pedigree service 108 may connect or otherwise couple to the one or more components via a communication interface. Thus, it should be appreciated that numerous configurations of product pedigree service 108 can be implemented and the present disclosure is not intended to be limited to any particular one. That is, the degree of integration and distribution of the functional component(s) provided herein can vary greatly from one embodiment to the next, as will be appreciated in light of this disclosure.

Referring to product pedigree service 108, product pedigree builder 110 is operable to retrieve touchpoint data of the organization's products from one or more data sources. The data sources can include the organization's enterprise applications and data repositories. The enterprise applications can include, for example, manufacturing applications, parts applications, sales applications, and other enterprise resource planning (ERP), supply chain management (SCM) applications, and/or order management (OM) applications. The data repositories can include, for example, DROPBOX, MICROSOFT ONEDRIVE, SHAREFILE, cloud-based storage service, or other suitable file system that hosts files, documents, and other materials. In some case, the data sources can include third party and/or vendor websites. For example, in a lifecycle of a particular product, various stakeholders (e.g., sales, supplier, assembly, deployment, logistics, reseller, and customer as illustrated in FIG. 1B) may come in contact and/or interact with the product at various points in the product's lifecycle. As explained above, the various stakeholders in the lifecycles of the organization's products can create and provide to the organization touchpoint data, which is a record of a stakeholder's contact and/or interaction (or "involvement") with a product. Depending on the stakeholder and/or type of touchpoint data that is being provided, the organization may receive the touchpoint data via one or more of its enterprise applications/systems. In some cases, the organization can store the provided touchpoint data in one or more of its data repositories.

Product pedigree builder 110 can utilize application programming interfaces (APIs) provided by the various data sources to query/retrieve information and materials (e.g., touchpoint data) therefrom. For example, product pedigree builder 110 can use a REST-based API or other suitable API provided by an enterprise application to query/retrieve information therefrom (e.g., to retrieve touchpoint data). In the case of web-based applications, product pedigree builder 110 can use a Web API provided by a web application to query/retrieve information therefrom (e.g., to retrieve touchpoint data). As another example, product pedigree builder 110 can use a file system interface to retrieve the files containing touchpoint data from a file system. As yet another example, product pedigree builder 110 can use an API to query/retrieve documents containing touchpoint data from a cloud-based storage service. A particular data source (e.g., an enterprise application and/or data source) can be hosted within a cloud computing environment (e.g., the cloud computing environment of product pedigree service 108 or a different cloud computing environment) or within an on-premises data center (e.g., an on-premises data center of the organization that utilizes product pedigree service 108).

In some embodiments, product pedigree builder 110 can retrieve touchpoint data from one or more of the various data sources on a continuous or periodic basis. For example, product pedigree builder 110 can retrieve touchpoint data from one or more of the various data sources in response to touchpoint data being received by the data sources or touchpoint data being provided by the stakeholders. For example, a data source, such as the organization's SCM application, can send a request/notification to product pedigree builder 110 upon receipt of touchpoint data from a supplier that is suppling a part(s)/component(s) for a product. In response to receiving the request/notification, product pedigree builder 110 can retrieve the touchpoint data from the data source (e.g., the SCM application). In some embodiments, product pedigree builder 110 can retrieve the touchpoint data according to a predetermined schedule specified by the organization. The schedule, for example, may be configured as part of the organization's policy.

Product pedigree builder 110 can use the retrieved touchpoint data of a stakeholder to create a data element of that touchpoint by that stakeholder. In other words, product pedigree builder 110 can create a data element of that touchpoint by that stakeholder based on the retrieved touchpoint data. The generated data element includes information about a particular stakeholder's contact and/or interaction with a particular product. For example, in one embodiment, the generated data element may be a timestamped, identity verified record that includes details regarding the who, what, and where aspects of a touchpoint of a product by a stakeholder (e.g., a record with details such as an identity of the stakeholder, a timestamp indicating a time of the contact and/or interaction with the product, role of the stakeholder, type of contact and/or interaction (e.g., booking, parts supply, assembly, etc.) with the product, and any other information and/or details about the contact and/or interaction such as documents exchanged, etc.). The information contained in the data element may be extracted and/or derived from the retrieved touchpoint data representing a touchpoint of the product by the stakeholder. That is, product pedigree builder 110 can create a data element which includes information about a touchpoint of a product by a stakeholder from the information provided by the stakeholder. In some embodiments, product pedigree builder 110 can include in a data element a hash of the contents of the data element (i.e., a hash of the information/data contained in the data element). For example, product pedigree builder 110 may generate a hash of the contents of a data element using a cryptographic hash function such as Secure Hash Algorithm 256-bit (SHA256), Secure Hash Algorithm 512-bit (SHA512), RIPE Message Digest (RIPEND), WHIRLPOOL, or any other suitable hash function. Including such a hash or digital fingerprint in a data element advantageously provides for differentiating the individual data elements from one another by the included hash.

Product pedigree builder 110 can add a newly created data element of a product to a pedigree list of the same product. Adding a new data element of a product to a pedigree list of the same product associates the new data element to the other data elements (e.g., the previously created or existing data elements) of the same product. In some embodiments, product pedigree builder 110 may add a new data element to a pedigree list of the same product by including in the new data element a hash of a last data element in the pedigree list. Adding the new data element to the pedigree list in this manner links the new data element to the last data element in the pedigree list and, as a result of this linking, associates the newly added data element to the other data elements in the pedigree list of the same product. Once the new data element is added to the pedigree list (i.e., once the new data element is linked to the last data element in the pedigree list), the last data element is no longer the last data element in the pedigree list and the newly added data element becomes a new last data element in the pedigree list. In the case where a new data element is a first data element being added to a pedigree list of a product (i.e., in the case where the newly added data element is a first record of the pedigree list of the product), the new data element may be considered a genesis record in the pedigree list of the product. In this case, the new data element added to the pedigree list (i.e., the genesis record) does not contain a hash of any data element in the pedigree list since there are no other data elements in the pedigree list other than the newly added data element. Also note that, for a particular data element other than a genesis record in a product pedigree list, since the contents of the data element includes a hash of a preceding data element in the pedigree list, the hash of the preceding data element is part of a hash of the contents of the data element. An illustrative pedigree list of a product (i.e., an illustrative product pedigree list) is described below with respect to FIG. 2.

In some embodiments, product pedigree builder 110 can store the product pedigree lists of the organization's products in a graph database. To do so, product pedigree builder 110 may convert or transform the product pedigree information of the product pedigree lists into a format suitable for storage in the graph database. The graph database can be provided as any type of database/datastore capable of storing unstructured data objects (i.e., objects having arbitrary formats and attributes) and relationships between such objects, and of efficiently querying stored objects and relationships. For example, in one embodiment, the graph database may provide an API that supports GraphQL or another open-source data query and manipulation language for querying and/or interacting with the data in the graph database.

In some embodiments, product pedigree builder 110 may store the product pedigree information of the product pedigree lists in the graph database in a labeled property graph (LPG) format in which each entity is represented as a node having a uniquely identifiable identifier (ID) and a set of key-values pairs or properties that characterizes the identified node. In the LPG format, a relationship between two (2) nodes (i.e., entities) may be represented as an edge or connection between the nodes. A relationship between two (2) nodes includes an ID that uniquely identifies the relationship and a type of the relationship between the two (2) nodes. The relationship also includes a set of key-value pairs or properties that characterizes the connection between the two (2) nodes (e.g., describes the relationship between the two nodes). Taking an illustrative case of a "Supplier A" supplying a "Part B" for a "Product C," a first entity may be the Supplier A, a second entity may be the Part B, and an edge between the first and second entities may represent a relationship between Supplier A and Part B. In the LPG format, a first node (e.g., Node ID=1) may represent the first entity and have a key-value pair that characterizes the first entity (e.g., key:value=supplier name:Supplier A), a second node (e.g., Node ID=2) may represent the second entity and have a key-value pair that characterizes the second entity (e.g., key:value=part number:part number of Part B), and an edge between the first and second nodes (e.g., Edge ID=1) may represent a relationship between the first entity and the second entity and have a key-value pair that characterizes the relationship between the first and second entities (e.g., key:value=relationship ID:identification number of the relationship "supplies"). Note that the first node and/or the second node may have additional key-value pairs that further characterize entity represented by the first node and/or the second node. Similarly, the edge may have additional key-value pairs that further characterize the relationship represented by the edge. For example, the second node (e.g., Node ID=2) may also have another key-value pair that described the identified part (e.g., key:value=part description:description of Part B).

In some embodiments, the graph database may correspond to an open-source graph database such as NEO4J, ARANGODB, APACHE, TINKERPOP, or TITAN. In some embodiments, the graph database may correspond to a storage service within the cloud computing environment of product pedigree service 108.

Still referring to product pedigree service 108, fraud detection module 114 is operable to predict whether a state of an input product pedigree list (i.e., an input pedigree list of a product) is normal or anomalous. In other words, fraud detection module 114 is operable to predict whether information contained in the individual data elements of the input product pedigree list is normal or anomalous. To this end, in some embodiments, fraud detection module 114 can include a deep learning algorithm, such as an autoencoder (also known as an MLP or ANN), that is trained and tested using machine learning techniques with a modeling dataset generated from the organization's historical product pedigree information (e.g., the touchpoint data provided by the various stakeholders in the lifecycles of the organization's historical products). Once the deep learning algorithm is trained, the ML model can, in response to input of a product pedigree list, predict whether the state of the input product pedigree list is normal or anomalous based on the learned behaviors (or "trends") in the modeling dataset. For example, to predict whether a product pedigree list is normal or anomalous, fraud detection module 114 can generate a feature vector, which is a multi-dimensional vector of elements or components that represent attributes of the information contained in the individual data elements of the product pedigree list. The represented attributes may include some or all the parameters and variables that may influence the prediction of whether the state of the product pedigree list is normal or anomalous. The generated feature vector can then be input to the ML model which outputs a prediction of whether the state of the product pedigree list is normal or anomalous. Further description of the training of the deep learning algorithm (e.g., autoencoder) implemented within contact fraud detection module 114 is provided below at least with respect to FIG. 3.

Service interface module 116 is operable to provide an interface to product pedigree service 108. For example, in one embodiment, service interface module 116 may include an API that can be used, for example, by client applications to access and utilize product pedigree service 108. For instance, a client application on a client device may send a request to determine whether a state of a product pedigree list is normal or anomalous to product pedigree service 108 via the API of service interface module 116. In some embodiments, service interface module 116 may include user interface (UI) controls that a user can click/tap/interact with to access and utilize product pedigree service 108. For example, the UI controls may be presented on a UI of a client application on a client device via which a user can access and interact with product pedigree service 108. For instance, in response to the user's input, the client application on the client device may send an appropriate request to product pedigree service 108 (e.g., send a request to determine whether a state of a product pedigree list is normal or anomalous). Note that applications other than client application on a client device, such as, for example, an application within product pedigree service 108, may use the API of service interface module 116 to send a request to determine whether a state of a product pedigree list is normal or anomalous to product pedigree service 108. In any case, such a request may include information regarding the product pedigree list for which anomaly detection (i.e., prediction) is to be performed.

Figure 2:
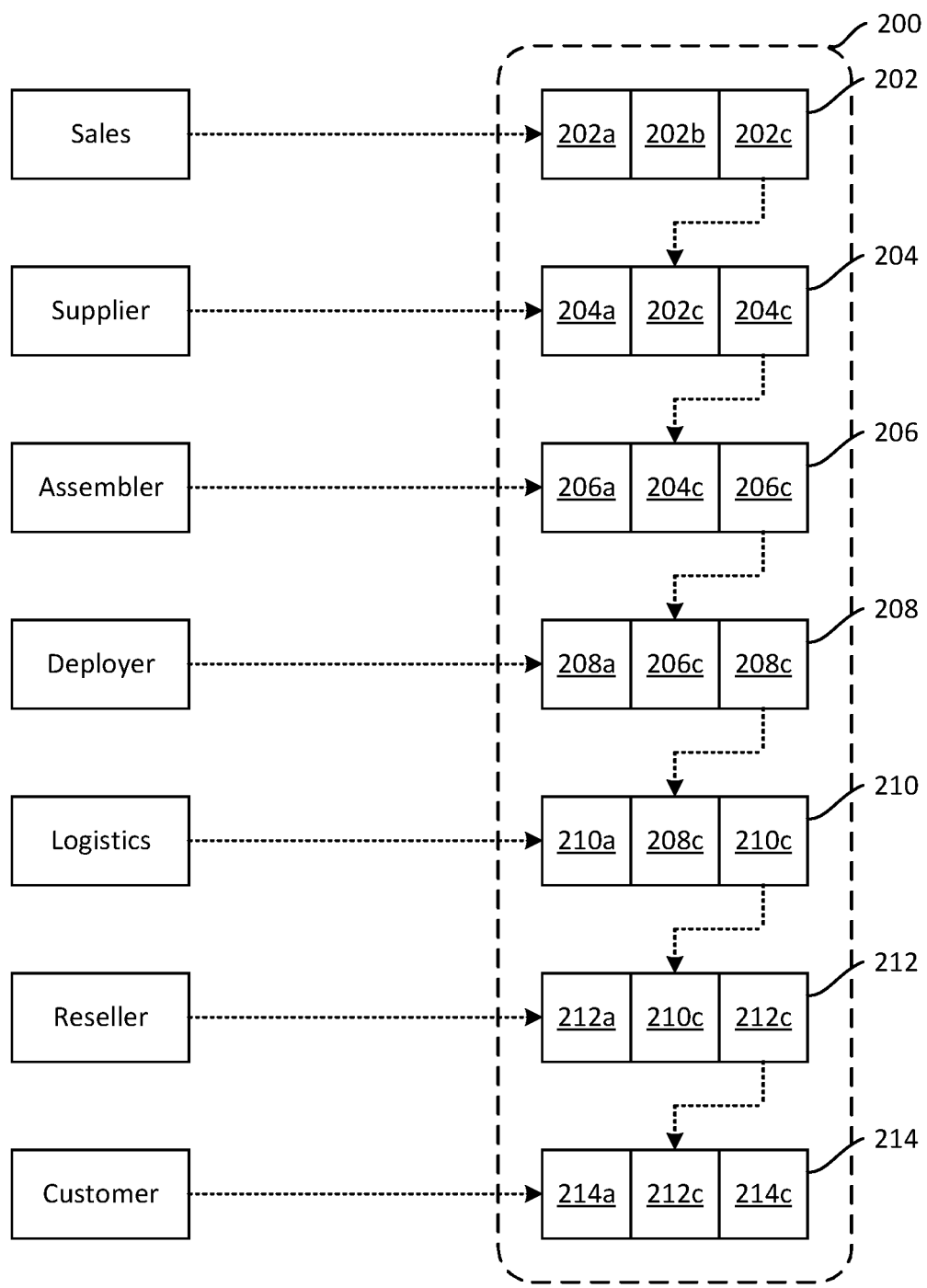
FIG. 2 is a diagram showing an illustrative product pedigree list, in accordance with an embodiment of the present disclosure.

FIG. 2 is a diagram showing an illustrative product pedigree list 200, in accordance with an embodiment of the present disclosure. For example, with continued reference to FIG. 1B, product pedigree list 200 may be generated by product pedigree builder 110—based on touchpoint data provided by the different stakeholders in the lifecycle of a product and stored in the organization's various data sources—and then stored in the graph database previously described herein. Product pedigree list 200 may be a pedigree list of a product (e.g., a new product or a historical product of the organization).

The illustrative product pedigree list 200 includes data elements 202-214. Data element 202 is a first data element (or genesis record) in product pedigree list 200 and may represent a touchpoint of a product by sales (e.g., represent a touchpoint by the organization's sales team). Data element 202 may be created and added to product pedigree list 200 upon retrieving the touchpoint data representing the touchpoint by sales (e.g., when an order for the product is booked by the organization's sales team). Data element 202 includes information about the touchpoint by sales (see reference numeral 202a in FIG. 2) and a hash of a preceding data element (see reference numeral 202b in FIG. 2). As data element 202 is a genesis record in product pedigree 200, the hash of the preceding data element may be empty or NULL. Data element 202 also includes a hash of the information about the touchpoint by sales and the hash of the preceding data element contained in data element 202 (see reference numeral 202c in FIG. 2).

Data element 204 is a second data element in product pedigree list 200 and may represent a touchpoint of the product by a supplier (e.g., represent a touchpoint by a supplier supplying a part(s)/component(s)/etc. for the product). Data element 204 may be created and added to product pedigree list 200 upon retrieving the touchpoint data representing the touchpoint by the supplier (e.g., upon receipt of the touchpoint data from the supplier). Data element 204 includes information about the touchpoint by the supplier (see reference numeral 204a in FIG. 2) and the hash of the preceding data element 202 in product pedigree list 200 (see reference numeral 202c in FIG. 2). The hash of the preceding data element 202 contained in data element 204 links data element 204 to data element 202. Data element 204 also includes a hash of the information about the touchpoint by the supplier and the hash of the preceding data element 202 contained in data element 204 (see reference numeral 204c in FIG. 2). Once data element 204 is added to product pedigree list 200, data element 202 is no longer a last data element in product pedigree list 200 and data element 204 becomes a new last data element in product pedigree list 200.

Data element 206 is a third data element in product pedigree list 200 and may represent a touchpoint of the product by an assembler (e.g., represent a touchpoint by an assembler assembling the product). Data element 206 may be created and added to product pedigree list 200 upon retrieving the touchpoint data representing the touchpoint by the assembler (e.g., upon receipt of the touchpoint data from the assembler). Data element 206 includes information about the touchpoint by the assembler (see reference numeral 206a in FIG. 2) and the hash of the preceding data element 204 in product pedigree list 200 (see reference numeral 204c in FIG. 2). The hash of the preceding data element 204 contained in data element 206 links data element 206 to data element 204. Data element 206 also includes a hash of the information about the touchpoint by the assembler and the hash of the preceding data element 204 contained in data element 206 (see reference numeral 206c in FIG. 2). Once data element 206 is added to product pedigree list 200, data element 204 is no longer a last data element in product pedigree list 200 and data element 206 becomes a new last data element in product pedigree list 200.

Data element 208 is a fourth data element in product pedigree list 200 and may represent a touchpoint of the product by a deployer (e.g., represent a touchpoint by a deployer deploying the product). Data element 208 may be created and added to product pedigree list 200 upon retrieving the touchpoint data representing the touchpoint by the deployer (e.g., upon receipt of the touchpoint data from the deployer). Data element 208 includes information about the touchpoint by the deployer (see reference numeral 208a in FIG. 2) and the hash of the preceding data element 206 in product pedigree list 200 (see reference numeral 206c in FIG. 2). The hash of the preceding data element 206 contained in data element 208 links data element 208 to data element 206. Data element 208 also includes a hash of the information about the touchpoint by the deployer and the hash of the preceding data element 206 contained in data element 208 (see reference numeral 208c in FIG. 2). Once data element 208 is added to product pedigree list 200, data element 206 is no longer a last data element in product pedigree list 200 and data element 208 becomes a new last data element in product pedigree list 200.

With continued reference to illustrative product pedigree list 200, data element 210 is a fifth data element in product pedigree list 200 and may represent a touchpoint of the product by a logistics provider (e.g., represent a touchpoint by a logistics provider providing logistics for the product).

Data element 210 may be created and added to product pedigree list 200 upon retrieving the touchpoint data representing the touchpoint by the logistics provider (e.g., upon receipt of the touchpoint data from the logistics provider). Data element 210 includes information about the touchpoint by the logistics provider (see reference numeral 210a in FIG. 2) and the hash of the preceding data element 208 in product pedigree list 200 (see reference numeral 208c in FIG. 2). The hash of the preceding data element 208 contained in data element 210 links data element 210 to data element 208. Data element 210 also includes a hash of the information about the touchpoint by the logistics provider and the hash of the preceding data element 208 contained in data element 210 (see reference numeral 210c in FIG. 2). Once data element 210 is added to product pedigree list 200, data element 208 is no longer a last data element in product pedigree list 200 and data element 210 becomes a new last data element in product pedigree list 200.

Data element 212 is a sixth data element in product pedigree list 200 and may represent a touchpoint of the product by a reseller (e.g., represent a touchpoint by a reseller that is reselling the product). Data element 212 may be created and added to product pedigree list 200 upon retrieving the touchpoint data representing the touchpoint by the reseller (e.g., upon receipt of the touchpoint data from the reseller). Data element 212 includes information about the touchpoint by the reseller (see reference numeral 212a in FIG. 2) and the hash of the preceding data element 210 in product pedigree list 200 (see reference numeral 210c in FIG. 2). The hash of the preceding data element 210 contained in data element 212 links data element 212 to data element 210. Data element 212 also includes a hash of the information about the touchpoint by the reseller and the hash of the preceding data element 210 contained in data element 212 (see reference numeral 212c in FIG. 2). Once data element 212 is added to product pedigree list 200, data element 210 is no longer a last data element in product pedigree list 200 and data element 212 becomes a new last data element in product pedigree list 200.

Data element 214 is a seventh data element in product pedigree list 200 and may represent a touchpoint of the product by a customer (e.g., represent a touchpoint by a customer that purchased the product for use). Data element 214 may be created and added to product pedigree list 200 upon retrieving the touchpoint data representing the touchpoint by the customer (e.g., when the sale of the product is finalized and reported to the organization). The sale of the product may be by the organization's sales team or by a different entity, such as by a reseller of the product. Data element 214 includes information about the touchpoint by the customer (see reference numeral 214a in FIG. 2) and the hash of the preceding data element 212 in product pedigree list 200 (see reference numeral 212c in FIG. 2). The hash of the preceding data element 212 contained in data element 214 links data element 214 to data element 212. Data element 214 also includes a hash of the information about the touchpoint by the customer and the hash of the preceding data element 212 contained in data element 214 (see reference numeral 214c in FIG. 2). Once data element 214 is added to product pedigree list 200, data element 212 is no longer a last data element in product pedigree list 200 and data element 214 becomes a new last data element in product pedigree list 200.

It should be understood that the product pedigree list shown in FIG. 2 is merely a simple example and that, in practice, product pedigree lists generated according to embodiments of the present disclosure may include a large number of data elements. It should also be understood that stakeholders shown in FIG. 2 is merely a simple example and that, in practice, product pedigree lists generated according to embodiments of the present disclosure may include product pedigree information which represent touchpoints by different stakeholders than those shown. For example, the stakeholders interacting with a product may vary depending on the different products and/or the type of product. As one example, an electrical device and a pharmaceutical drug may have different stakeholders. As another example, a customized (made to order) computing device and a commodity computing device may have different stakeholders. Numerous variations and configurations will be apparent in light of this disclosure.

Figure 3:
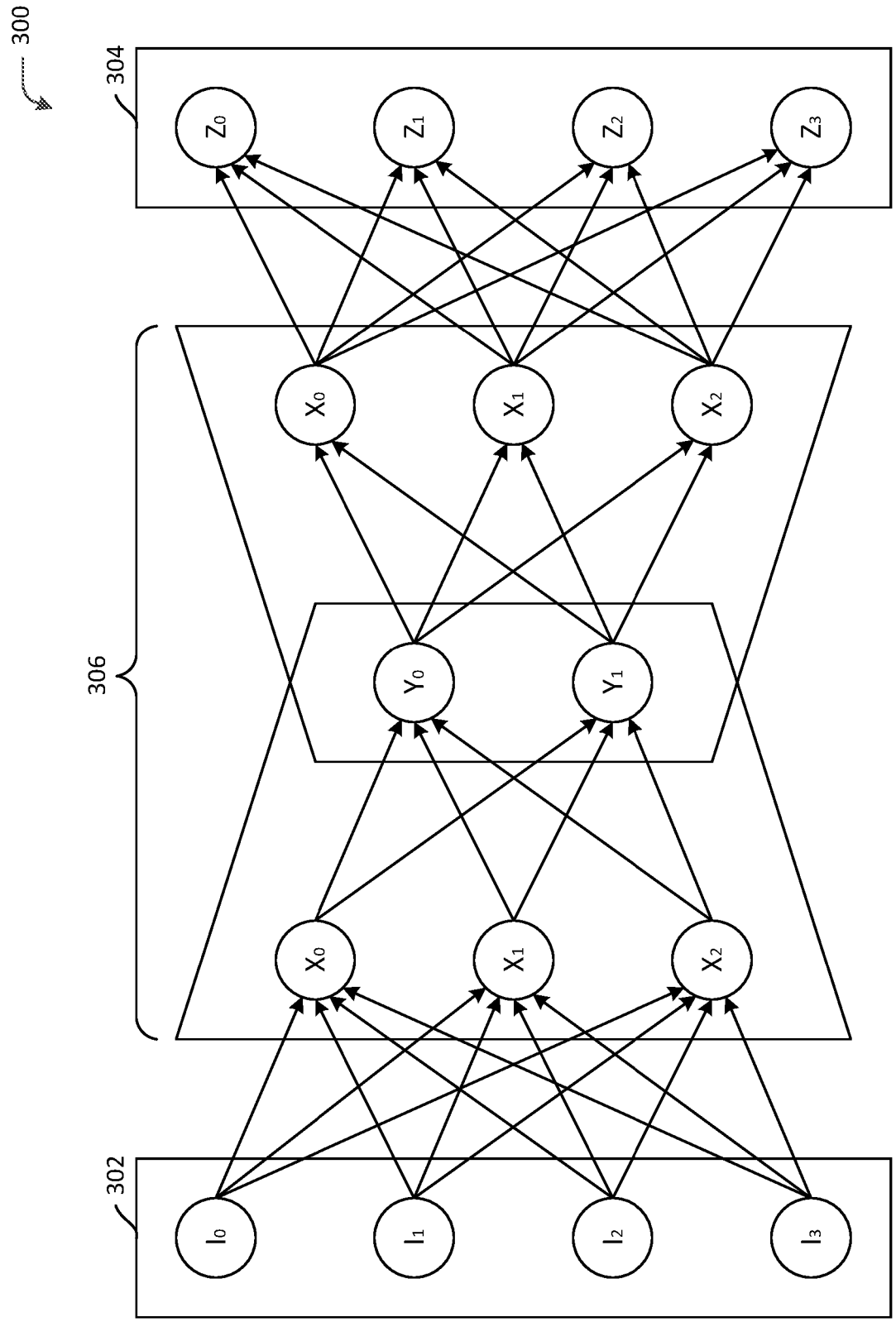
FIG. 3 is a diagram illustrating an example architecture of an autoencoder of a fraud detection module, in accordance with an embodiment of the present disclosure.

Turning to FIG. 3, an autoencoder 300 may correspond to an autoencoder implemented within fraud detection module 114. Illustrative autoencoder 300 includes an input layer 302, an output layer 304, and any number of hidden layers 306 between input layer 302 and output layer 304. In brief, autoencoder 300 operates to compress the data (e.g., product pedigree information contained in the product pedigree lists) to a lower dimensionality representation, which captures the correlations and interactions between the various variables and parameters in the data.

In more detail, autoencoder 300 can be trained using the organization's historical product pedigree information (e.g., data from normal operating state of the supply chain and manufacturing systems). Autoencoder 300 operates to first compress the input data to a lower dimensional representation, which is also referred to as a latent variable or latent representation. Autoencoder 300 then maps the latent variable (or latent representation) to a reconstruction of the input data, wherein the reconstructed input data has the same dimensionality as the input data. During the dimensionality reduction, autoencoder 300 learns the interactions between the various variables and is able to reconstruct the lower dimensional representation of the input variables back to the original variables at the output. A fraud scenario by any one of the stakeholders appearing in the data should affect the interaction between the variables (e.g., an anomalous behavior by any stakeholder in a product pedigree list will affect the interaction between the variables). In such cases, the number of errors tend to increase in the reconstruction of the input variables. By utilizing probability distribution of the reconstruction error, the ML model can identify whether a sample data point (e.g., a touchpoint by a stakeholder) is normal or anomalous.

In some embodiments, training of autoencoder 300 can be performed using a global loss function (e.g., mean squared error), which measures the deviation of the output data (i.e., the reconstructed input data) from the input data. Validation of autoencoder 300 can be performed using an optimization algorithm (e.g., Adam) for stochastic optimization of autoencoder 300. In cases of high loss value, which indicates that the ML model is not sufficiently trained, hyperparameter search and tuning may be performed to achieve a desired level of ML model performance and accuracy (e.g., to achieve optimal ML model performance and accuracy).

Figure 4:
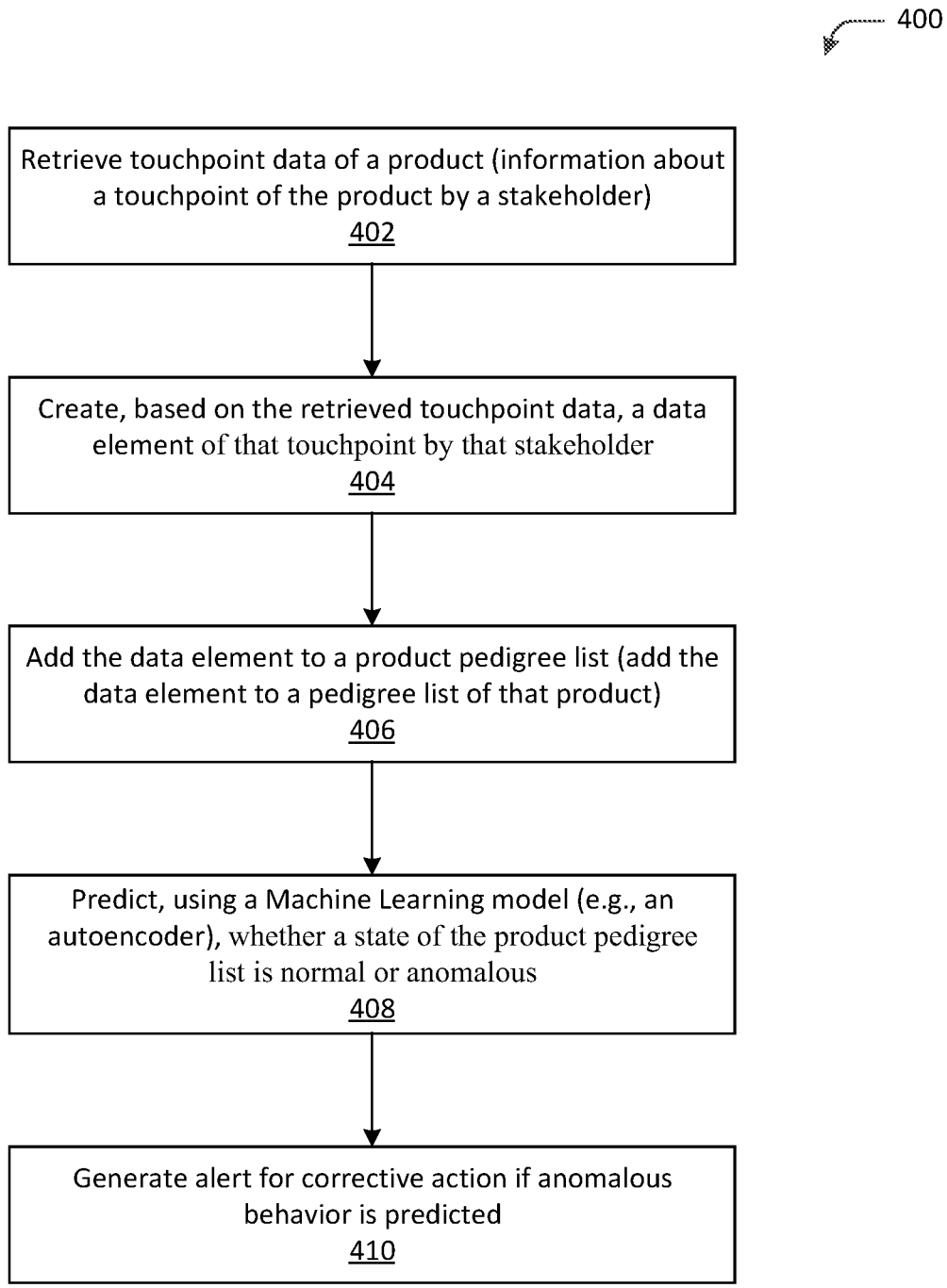
FIG. 4 is a flow diagram of an example process for verification of product pedigree information, in accordance with an embodiment of the present disclosure.

FIG. 4 is a flow diagram of an example process 400 for verification of product pedigree information, in accordance with an embodiment of the present disclosure. Process 400 may be implemented or performed by any suitable hardware, or combination of hardware and software, including without limitation the components of network environment 100 shown and described with respect to FIGS. 1A and 1B, the computing device shown and described with respect to FIG. 5, or a combination thereof. For example, in some embodiments, the operations, functions, or actions illustrated in process 400 may be performed, for example, in whole or in part by product pedigree builder 110 and fraud detection module 114, or any combination of these including other components of product pedigree service 108 described with respect to FIGS. 1A and 1B.

With reference to process 400 of FIG. 4 and with continued reference to FIGS. 1A and 1B, in an illustrative use case, at 402, product pedigree builder 110 can retrieve touch point data of a product. The product may be a new product that is being manufactured/produced by an organization that is using product pedigree service 108 to validate the product pedigree of its products. The touchpoint data may be retrieved from one or more of the organization's data sources. The retrieved touchpoint data is indicative of or represents a touchpoint of the product by a stakeholder.

At 404, product pedigree builder 110 can create, based on the retrieved touchpoint data of the product, a data element which includes information about that touchpoint by that stakeholder. This data element includes information about that stakeholder's contact and/or interaction with the product. In some embodiments, product pedigree builder 110 can include in the data element a hash of the contents of the data element (i.e., a hash of the information/data contained in the data element) such that the created data element includes a hash of its contents.

At 406, product pedigree builder 110 can add the created data element to a product pedigree list. The product pedigree list is a pedigree list which contains the data elements of the same product. For example, the data element can be added to the product pedigree list by including in the newly added data element the hash of the last data element in the product pedigree list.

At 408, fraud detection module 114 can predict, using a ML model (e.g., an autoencoder) whether a state of the product pedigree list is normal or anomalous. To do so, fraud detection module 114 can generate a feature vector that represents attributes of the information contained in the individual data elements of the product pedigree list. The generated feature vector can then be input to the ML model which outputs a prediction of whether the state of the product pedigree list is normal or anomalous.

At 410, fraud detection module 114 can, in response to a prediction that the state of the product pedigree list is anomalous, generate an alert for corrective action. For example, fraud detection module 114 can generate and send a notification, such as an email message or other electronic communication, informing of the detected anomalous behavior to the organization's fraud handing team. In response to such notification, the organization's fraud handling team may undertake appropriate corrective action.

Figure 5:
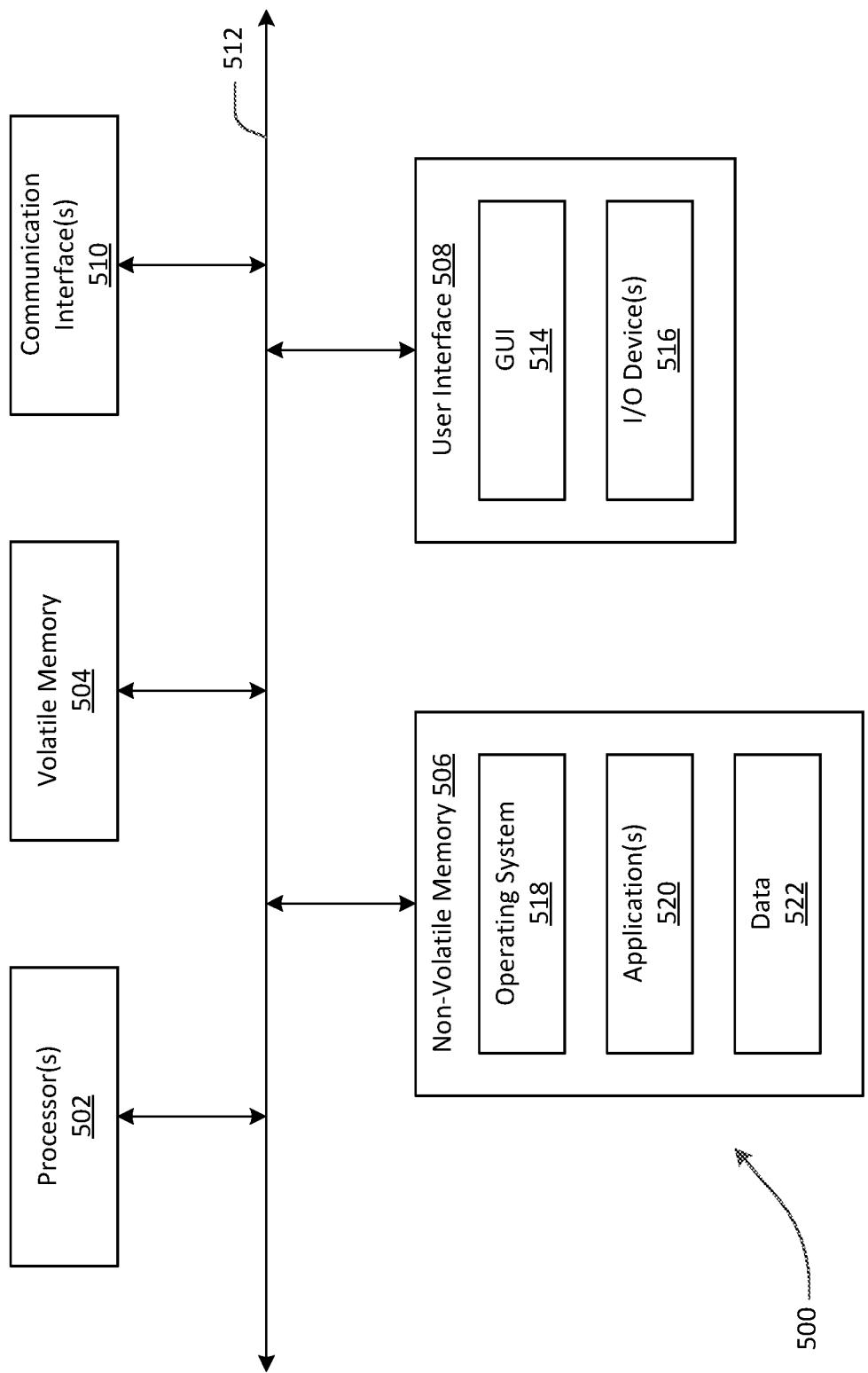
FIG. 5 is a block diagram illustrating selective components of an example computing device in which various aspects of the disclosure may be implemented, in accordance with an embodiment of the present disclosure.

FIG. 5 is a block diagram illustrating selective components of an example computing device 500 in which various aspects of the disclosure may be implemented, in accordance with an embodiment of the present disclosure. As shown, computing device 500 includes one or more processors 502, a volatile memory 504 (e.g., random access memory (RAM)), a non-volatile memory 506, a user interface (UI) 508, one or more communications interfaces 510, and a communications bus 512.

Non-volatile memory 506 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 508 may include a graphical user interface (GUI) 514 (e.g., a touchscreen, a display, etc.) and one or more input/output (I/O) devices 516 (e.g., a mouse, a keyboard, a microphone, one or more speakers, one or more cameras, one or more biometric scanners, one or more environmental sensors, and one or more accelerometers, etc.).

Non-volatile memory 506 stores an operating system 518, one or more applications 520, and data 522 such that, for example, computer instructions of operating system 518 and/or applications 520 are executed by processor(s) 502 out of volatile memory 504. In one example, computer instructions of operating system 518 and/or applications 520 are executed by processor(s) 502 out of volatile memory 504 to perform all or part of the processes described herein (e.g., processes illustrated and described in reference to FIGS. 1 through 4). In some embodiments, volatile memory 504 may include one or more types of RAM and/or a cache memory that may offer a faster response time than a main memory. Data may be entered using an input device of GUI 514 or received from I/O device(s) 516. Various elements of computing device 500 may communicate via communications bus 512.

The illustrated computing device 500 is shown merely as an illustrative client device or server and may be implemented by any computing or processing environment with any type of machine or set of machines that may have suitable hardware and/or software capable of operating as described herein.

Processor(s) 502 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 502 may be analog, digital or mixed signal. In some embodiments, processor 502 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 510 may include one or more interfaces to enable computing device 500 to access a computer network such as a Local Area Network (LAN), a Wide Area Network (WAN), a Personal Area Network (PAN), or the Internet through a variety of wired and/or wireless connections, including cellular connections.

In described embodiments, computing device 500 may execute an application on behalf of a user of a client device. For example, computing device 500 may execute one or more virtual machines managed by a hypervisor. Each virtual machine may provide an execution session within which applications execute on behalf of a user or a client device, such as a hosted desktop session. Computing device 500 may also execute a terminal services session to provide a hosted desktop environment. Computing device 500 may provide access to a remote computing environment including one or more applications, one or more desktop applications, and one or more desktop sessions in which one or more applications may execute.

In the foregoing detailed description, various features of embodiments are grouped together for the purpose of streamlining the disclosure. This method of disclosure is not to be interpreted as reflecting an intention that the claims require more features than are expressly recited. Rather, inventive aspects may lie in less than all features of each disclosed embodiment.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Elements of different embodiments described herein may be combined to form other embodiments not specifically set forth above. Other embodiments not specifically described herein are also within the scope of the following claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the scope of the present disclosure. Accordingly, it is intended that the scope of the present disclosure be limited not by this detailed description, but rather by the claims appended hereto.

What is claimed is:

1. A method comprising:
   retrieving, by a computing device, touchpoint data of a product;
   creating, by the computing device, a data element based on the retrieved touchpoint data, the data element including information about a touchpoint of the product by a stakeholder;
   adding, by the computing device, the created data element to a product pedigree list by at least linking the created data element to a last data element in the product pedigree list and including in the created data element a hash of the last data element, wherein the product pedigree list is a pedigree list which contains data elements of the product;
   determining, by the computing device, whether a state of the product pedigree list is normal or anomalous; and
   in response to a determination that the state of the product pedigree list is anomalous, generating and sending, by the computing device, an electronic communication to a fraud handling team associated with the product informing of the anomalous state.

2. The method of claim 1, further comprising storing, by the computing device, the product pedigree list in a graph database.

3. The method of claim 2, wherein the product pedigree list is stored in the graph database in a labeled property graph (LPG) format.

4. The method of claim 1, wherein the determining whether the state of the product pedigree list is normal or anomalous includes predicting, by the computing device using a machine learning (ML) model, whether the state of the product pedigree list is normal or anomalous.

5. The method of claim 4, wherein the ML model includes an autoencoder.

6. A system comprising:
one or more non-transitory machine-readable mediums configured to store instructions; and
one or more processors configured to execute the instructions stored on the one or more non-transitory machine-readable mediums, wherein execution of the instructions causes the one or more processors to carry out a process comprising:
retrieving touchpoint data of a product;
creating a data element based on the retrieved touchpoint data, the data element including information about a touchpoint of the product by a stakeholder;
adding the created data element to a product pedigree list by at least linking the created data element to a last data element in the product pedigree list and including in the created data element a hash of the last data element, wherein the product pedigree list is a pedigree list which contains data elements of the product;
determining whether a state of the product pedigree list is normal or anomalous; and
in response to a determination that the state of the product pedigree list is anomalous, generating and sending an electronic communication to a fraud handling team associated with the product informing of the anomalous state.

7. The system of claim 6, wherein the process further comprises storing the product pedigree list in a graph database.

8. The system of claim 7, wherein the product pedigree list is stored in the graph database in a labeled property graph (LPG) format.

9. The system of claim 6, wherein the determining whether the state of the product pedigree list is normal or anomalous includes predicting, using a machine learning (ML) model, whether the state of the product pedigree list is normal or anomalous.

10. The system of claim 9, wherein the ML model includes an autoencoder.

11. A non-transitory machine-readable medium encoding instructions that when executed by one or more processors cause a process to be carried out, the process including:
retrieving touchpoint data of a product;
creating a data element based on the retrieved touchpoint data, the data element including information about a touchpoint of the product by a stakeholder;
adding the created data element to a product pedigree list by at least linking the created data element to a last data element in the product pedigree list and including in the created data element a hash of the last data element, wherein the product pedigree list is a pedigree list which contains data elements of the product;
determining whether a state of the product pedigree list is normal or anomalous; and
in response to a determination that the state of the product pedigree list is anomalous, generating and sending an electronic communication to a fraud handling team associated with the product informing of the anomalous state.

12. The machine-readable medium of claim 11, wherein the process further comprises storing the product pedigree list in a graph database.

13. The machine-readable medium of claim 11, wherein the determining whether the state of the product pedigree list is normal or anomalous includes predicting, using a machine learning (ML) model, whether the state of the product pedigree list is normal or anomalous, wherein the ML model includes an autoencoder.

* * * * *